United States Patent [19]

Dinnan

[11] Patent Number: 5,295,804
[45] Date of Patent: Mar. 22, 1994

[54] FEMALE MOLD INCLUDING DECORATING INSERT FOR DIFFERENTIAL PRESSURE FORMING

[76] Inventor: Timothy P. Dinnan, 2803 Valorie, Midland, Mich. 48640

[21] Appl. No.: 919,841

[22] Filed: Jul. 27, 1992

[51] Int. Cl.⁵ ............................................. B29C 51/30
[52] U.S. Cl. ................................ 425/182; 425/387.1; 425/398
[58] Field of Search ...................... 425/183, 185, 387.1, 425/388, 398, 412, 182; 249/102, 103

[56] References Cited

U.S. PATENT DOCUMENTS

| | | | |
|---|---|---|---|
| 490,966 | 1/1893 | Irwin | 249/103 |
| 1,844,987 | 2/1932 | Slick | 249/103 |
| 2,054,553 | 9/1936 | Ballard | 249/103 |
| 2,919,470 | 1/1960 | Deters | 249/103 |
| 3,172,159 | 3/1965 | Edwards | 425/387.1 |
| 3,380,121 | 4/1968 | Chittenden et al. | 425/408 |
| 3,414,941 | 12/1968 | Ignell | 425/398 |
| 3,550,197 | 12/1970 | Szajna et al. | 425/182 |
| 3,734,448 | 5/1973 | Rusk et al. | 249/103 |
| 4,363,617 | 12/1982 | Hirsekorn | 425/388 |
| 4,383,815 | 5/1983 | Kiefer et al. | 425/387.1 |
| 4,384,702 | 5/1983 | Boskovic | 425/195 |
| 4,704,237 | 11/1987 | Taylor, Jr. et al. | 425/388 |
| 4,705,471 | 11/1987 | Shah et al. | 425/398 |
| 4,979,720 | 12/1990 | Robinson | 249/103 |

FOREIGN PATENT DOCUMENTS

3537376  4/1987  Fed. Rep. of Germany ...... 425/398

*Primary Examiner*—Jay H. Woo
*Assistant Examiner*—Robert B. Davis
*Attorney, Agent, or Firm*—John J. Swartz

[57] ABSTRACT

Apparatus for differential pressure forming an article in a thermoplastic sheet including a female mold cavity mounting a one piece, ring-shaped detachable mold insert for forming at least a portion of the article. The insert is formed by rolling a crescent shaped sheet, having opposite ends into a truncated cone with opposite ends thereof in abutting relation, inserting the truncated cone shaped mold insert into a mold cavity, and applying endwise force to the ends of the mold insert to detachably secure the mold in a mold body.

40 Claims, 5 Drawing Sheets

FEMALE MOLD INCLUDING DECORATING INSERT FOR DIFFERENTIAL PRESSURE FORMING

BACKGROUND OF THE INVENTION

1. Field of the Invention

This invention relates to a differential pressure female mold having a replaceable mold insert therein for use in making short runs of thermoplastic articles which are custom decorated for private events such as birthday parties, weddings and graduations. More particularly this invention relates to a differential pressure female mold including a one piece, ring-shaped, decorating insert which is detachably received in a mold cavity for decorating a portion of the article being formed and a threaded retaining ring for securing the decorating insert.

2. Description of the Prior Art and Objects

Thermoplastic articles have been differentially pressure formed heretofore via differential pressure mold apparatus such as that disclosed in U.S. Pat. No. 4,969,812 granted to Gaylord Brown on Nov. 13, 1990. Such articles are frequently decorated with words, symbols or logos integrally molded, in the side wall thereof. The interior wall surfaces of the molds are formed with appropriate recesses and/or projections thereon to appropriately relieve the surface of the article being formed with the desired word, symbol or logo.

Such ornamentalizing is normally generic in nature and not personalized. Because of the relatively high cost of a mold, the cost of personalizing articles, such as cups for weddings, showers, birthday parties, etc., is generally prohibitive. Accordingly, it is an object of the present invention to provide differential pressure forming apparatus which will economically allow short runs of personalized thermoplastic articles to be formed.

It has been found that by placing a removeable mold insert in a female mold cavity, a personalized short run article can be manufactured.

The U.S. Pat. No. 490,966 issued to J. S. Irwin on Jan. 31, 1893, discloses a mold having a removeable die for forming an inscription in a glass jar being molded. With such dies, however, the article formed is sometimes aesthetically unacceptable.

The U.S. Pat. No. 3,380,121 issued to R. M. Chittenden, et al on Apr. 30, 1968 discloses a replaceable mold insert with indicia thereon, however, this patentee utilizes a multi-section mold with multi-section inserts in a blow molding operation. Other patents which were uncovered during a preliminary patentability search are as follows:

| | | |
|---|---|---|
| 4,979,720 | Robinson | Dec. 25, 1990 |
| 4,384,702 | Boskovic | May 24, 1983 |
| 3,734,448 | Rusk et al | May 22, 1973 |
| 2,919,470 | Deters | Jan. 5, 1960 |
| 2,054,553 | Ballard | Sep. 15, 1936 |
| 1,844,987 | Slick | Feb. 16, 1932 |

Another object of the present invention is to provide differential pressure mold apparatus of the type described which can relatively and inexpensively mold personalized articles in a thermoplastic material.

It is another object of the present invention to provide mold apparatus of the type described which includes a ring shaped decortaing insert detachably received by a female mold cavity.

Yet another object of the present invention is to provide differential pressure mold apparatus of the type described including a mold body having a cavity which receives a ring shaped replaceable insert for ornamentalizing an article to be formed and a retaining ring threadedly received on the mold body for securing the insert.

A further object of the present invention is to provide mold apparatus of the type described including a one piece, truncated come shaped decorating insert detachably mounted in a female mold cavity.

A still further object of the present invention is to provide apparatus for differentially pressure forming an article in a sheet of thermoplastic material including a mold cavity and a detachable relief forming insert in a female mold cavity formed from a crescent shaped sheet of material having opposite ends rolled into a truncated cone with the opposite ends thereof in abutting relation.

Another object of the present invention is to provide an ornamentalizing insert for a differential pressure forming machine of the type described including a one-piece mold liner which has a hollow, truncated cone shape and is provided with an internal surface formed in relief to shape the contour of a portion of an article being formed.

Other objects and advantages of the present invention will become apparent to those of ordinary skill in the art as the description thereof proceeds.

SUMMARY OF THE INVENTION

A female mold for differential pressure forming an article in a sheet of thermoplastic material comprising a mold body including a mold cavity, mechanism for communicating a differential pressure to the cavity to draw a portion of the sheet into the cavity, a replaceable mold liner detachably received in the cavity, and an annular retaining ring threadedly mounted on the mold body for detachably retaining the mold liner in the cavity.

DESCRIPTION OF THE DRAWINGS

The invention may be more readily understood by referring to the accompanying drawings, in which.

DESCRIPTION OF THE PREFERRED EMBODIMENT

Apparatus, generally designated 10, is provided for differential pressure forming an article A in a sheet of thermoplastic material, generally designated S. The apparatus constructed according to the present invention is particularly adapted for use in a differential pressure forming machine such as that disclosed in reissue U.S. Pat. No. Re. 27,137 granted to G. W. Brown, et al on Jun. 8, 1971 and incorporated herein by reference.

The apparatus 10 includes an upper, male die box assembly, generally designated 12, and a lower, female die box assembly, generally designated 14.

Figure 1:
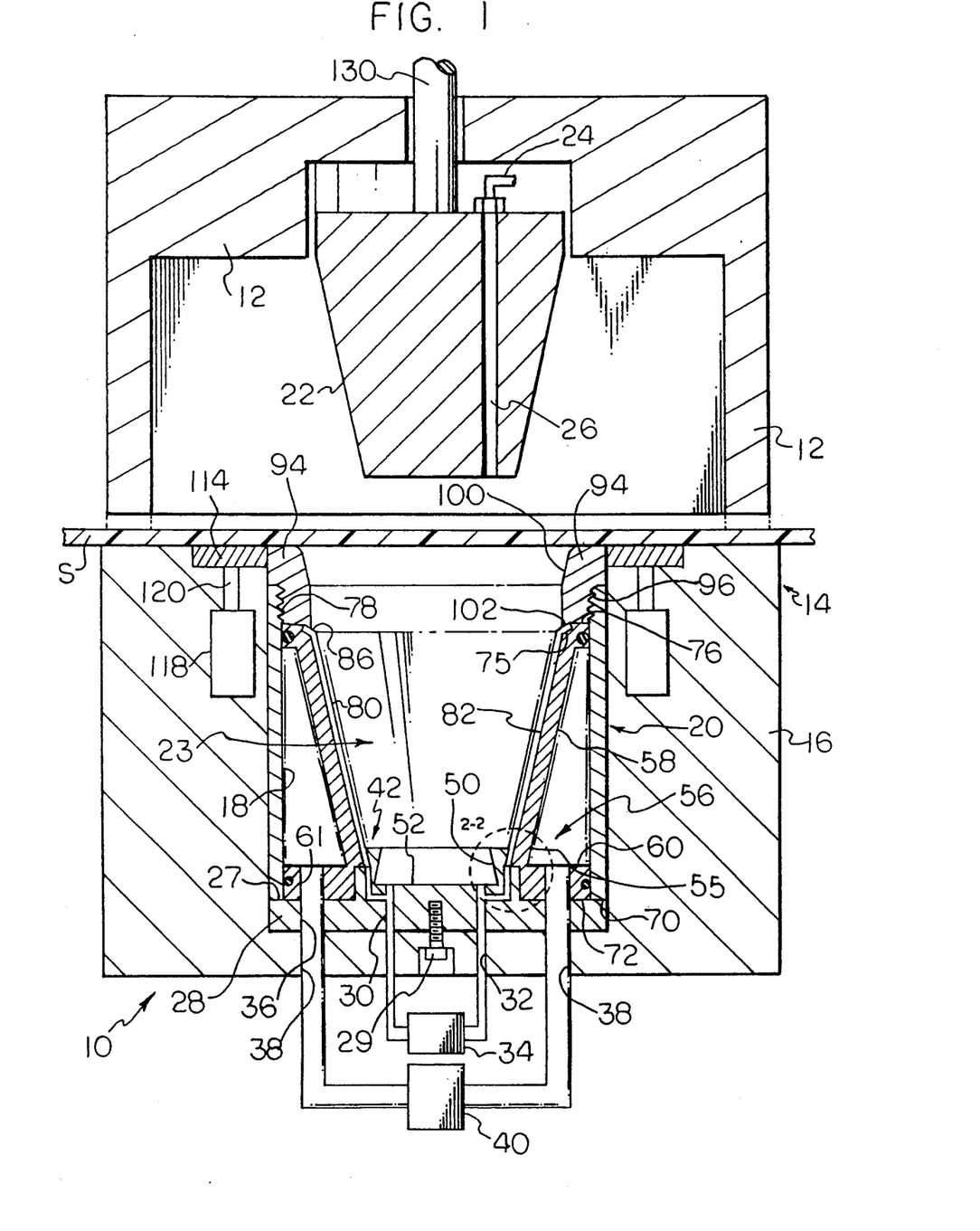
FIG. 1 is a sectional side view illustrating mold apparatus constructed according to the present invention with the molds illustrated in the spaced apart positions.
Figure 3:
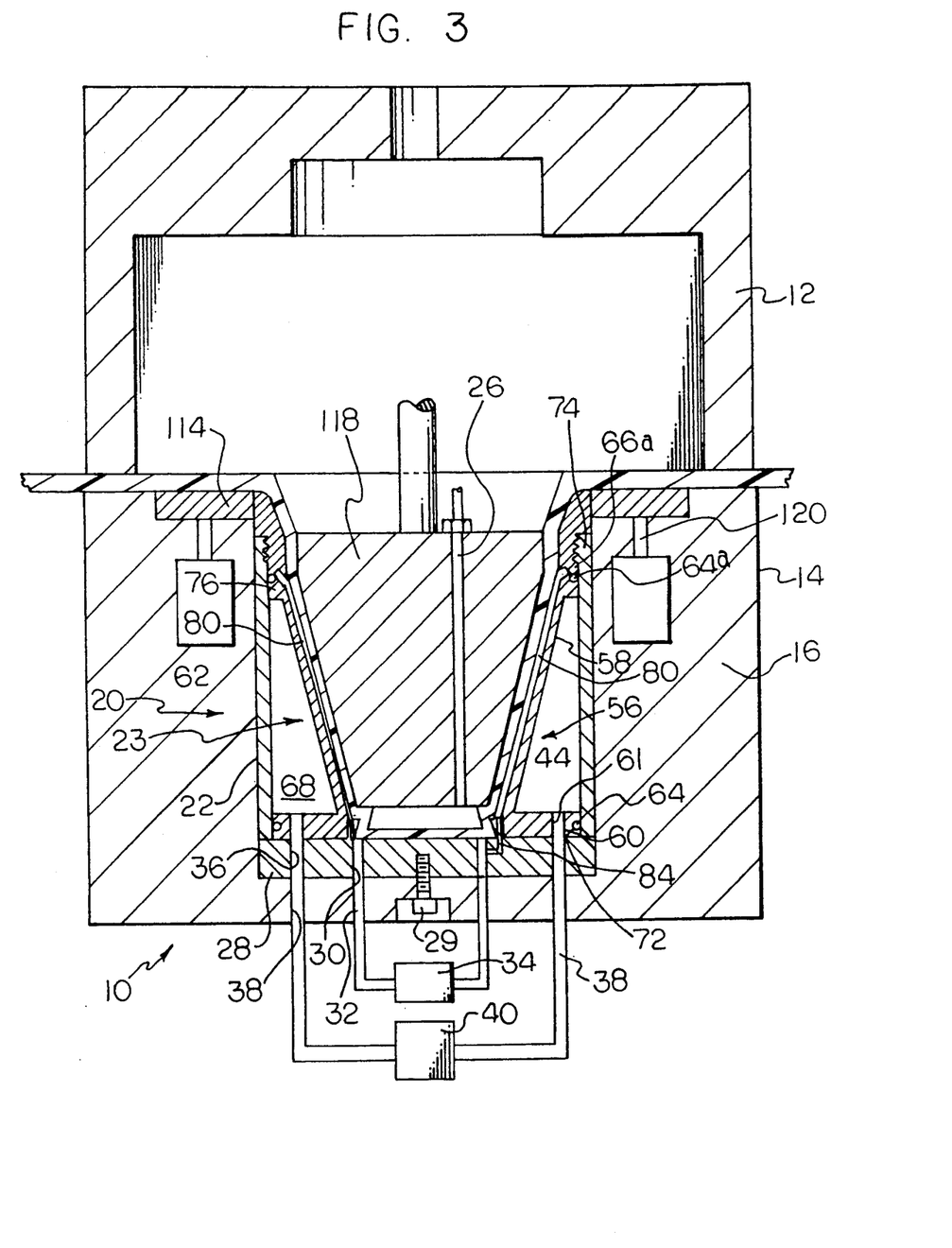
FIG. 3 is a sectional side view similar to FIG. 1 but illustrating a mold apparatus in a closed article forming position.

The die box assemblies 12 and 14 are moveable between spaced apart positions illustrated in solid lines in FIG. 1 and closed positions, engaging opposite sides of a sheet S, as illustrated in FIG. 3, to differentially pressure form an article A in the sheet S. The articles A may suitably comprise thin walled truncated, cone shaped cups, such as drinking cups.

The female die box assembly 14 includes a mold body, generally designated 16, having a recess 18 therein mounting a female mold, generally designated 20, defining a female mold cavity 23.

The male die box assembly 12 includes a male punch or plug 22 in alignment with the female mold cavity 23. If desired, an air assist 24 may be provided for introducing the air under pressure thru ports 26 in the male plug 22 to aid the movement of the sheet S into the female mold cavity 23.

The female mold, generally designated 20, includes a base 28 received in the recess 18 and coupled to the mold body 16 via threaded bolts 29. Vacuum ports 30 are provided in the base 28 in communication with ports 32 provided in the mold body 16. The ports 32 are coupled to a suitable vacuum source 34. The base 28 also includes water ports 36 in fluid communication with water ports 38 provided in the base mold body 16 which communicate with a suitable water source 40. The temperature of the water provided by water source 40 can be controlled for cooling purposes.

Disposed inside the mold recess 18 and extending upwardly from the upper surface 27 of the base 28 is a centrally disposed, integral, raised annular retaining fixture 42 having, along its upper, perimetrically outer surface 44 an annular, insert receiving, notch or slot, generally designated 46, for a purpose to be described more particularly hereinafter. As is illustrated, the base 48 of slot 46 is wider than the upper throat portion 49 thereof for a purpose to become apparent hereinafter.

The annular retaining fixture 42 includes a radially inner wall surface 50 which diverges radially outwardly in an axially inward direction to the upper surface 52 of the base 28 for forming an annular step 54 (FIG. 10) at the base of the sidewall of the article A.

Mounted on the base 28 is a main body side ring, generally designated 56, having a tapered annular side wall 58 which diverges radially outwardly in an axially outer direction away from the base 28. The lower end 55 of side wall 58 is integral with a radially outwardly extending annular flange 60 provided with water ports 61 therein in communication with the water ports 36 and 38 in the base 28 and mold body 16, respectively. The upper end of side wall 58 includes an upper, cylindrical sealing portion 76.

A cylindrical sleeve 62 surrounds the main body side ring 56 and is sealed thereto via vertically spaced annular o-rings 64 and 64a received in a pair of vertically spaced, annular slots 66 and 66a, respectively, provided in the outer wall surface of main body side annular flange 60 and the upper cylindrical sealing portion 76. The sleeve 62 and main body side ring 56 cooperate to define an annular water jacket 68 for receiving water to control the temperature of the female mold assembly.

It should be noted that although the lower edges 70 and 72 of the cylindrical sleeve 62 and main body side ring 56, respectively, are at the same level, the upper portion 74 of cylindrical sleeve 62 extends a substantial distance above the upper edge portion 76 of main body side ring 56. The upper extension portion 74 is internally threaded at 78 for a purpose to become apparent hereinafter.

The upper cylindrical edge portion 76 includes a tapered surface portion 75 which is radially outwardly flared in an axially outward direction as illustrated in FIG. 3 for a purpose to become apparent.

A one-piece, truncated frusto-conically shaped ornamentalizing insert, generally designated 80, is mounted on the interior tapered face 82 of the tapered side wall 58 defining the mold cavity 23. The lower annular edge portion 84 of the sleeve insert 80 is received by the annular slot 44 in the retaining ring 42.

Figure 7:
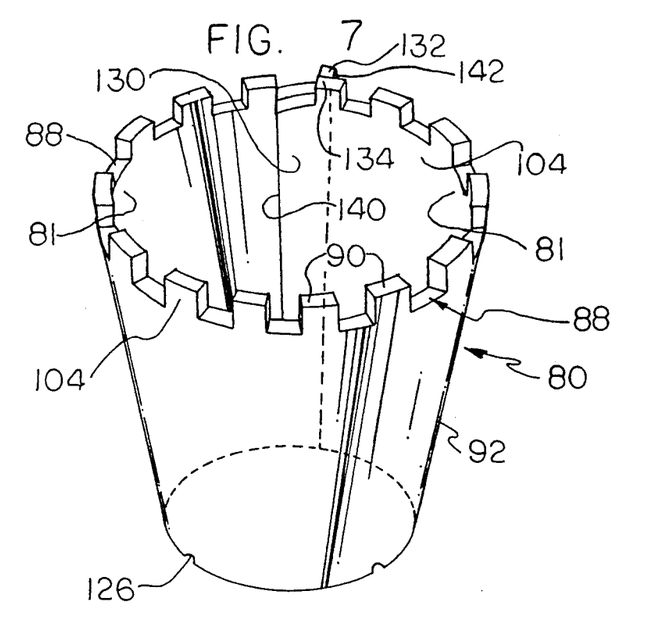
FIG. 7 is an enlarged perspective view illustrating the decorating insert only constructed according to the present invention in an interim stage of assembly.

The upper, axiallly outermost, annular terminal edge portion 86 of insert 80 includes a plurality of slits or notches 88 defining a plurality of circumferentially spaced apart terminal securing tabs 90 which are initially in alignment with the remaining portion 92 of the side wall 80 as illustrated in FIG. 7.

Figure 10:
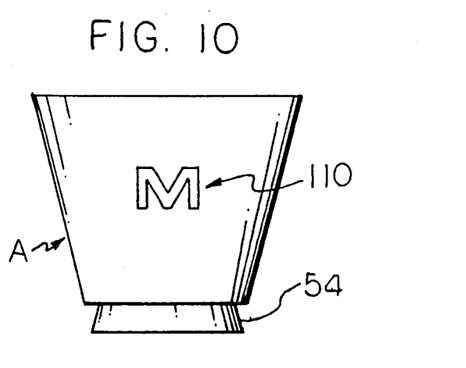
FIG. 10 is a reduced side elevational view of an article manufactured with apparatus constructed according to the present invention.
Figure 11:
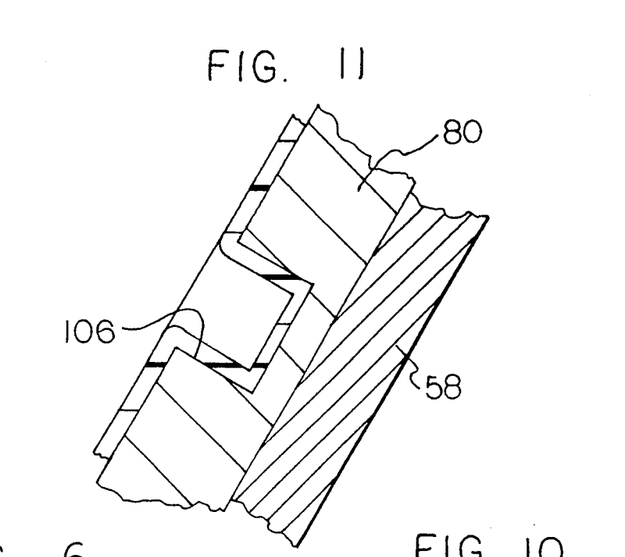
FIG. 11 is a greatly enlarged sectional view, taken along the line 11—11 of FIG. 6, in a molding position, to more clearly illustrate the embossing provided on an embossing insert constructed according to the present invention.

The ornamentalizing sleeve insert 80 has an inner surface 81 formed in hollow relief with an embossing recess, generally designated 104a, which may suitably comprise a slot 106. For purposes of example, the embossing recess 104a is illustrated as a slot defining the English letter M. The slot 106 will receive a portion of the sheet S and integrally mold or emboss an ornamental letter 110, illustrated as the letter M, into the side wall of the article being formed as illustrated in FIG. 10. This forming technique is generally referred to as embossing.

The ornamentalizing insert 80 is secured to the base 27 via an axially outer insert retaining ring 94 which includes an externally threaded portion 96 for threading onto the internal thread 78 of the cylinder 62.

The top insert retaining ring 94 also includes an axially inner, annular, insert retaining clamping lip 100 having a vertically outwardly, radially outwardly inclined outer surface 102 which extends parallel to the inclined surface 75 of main body side ring 56.

Figures 8, 9:
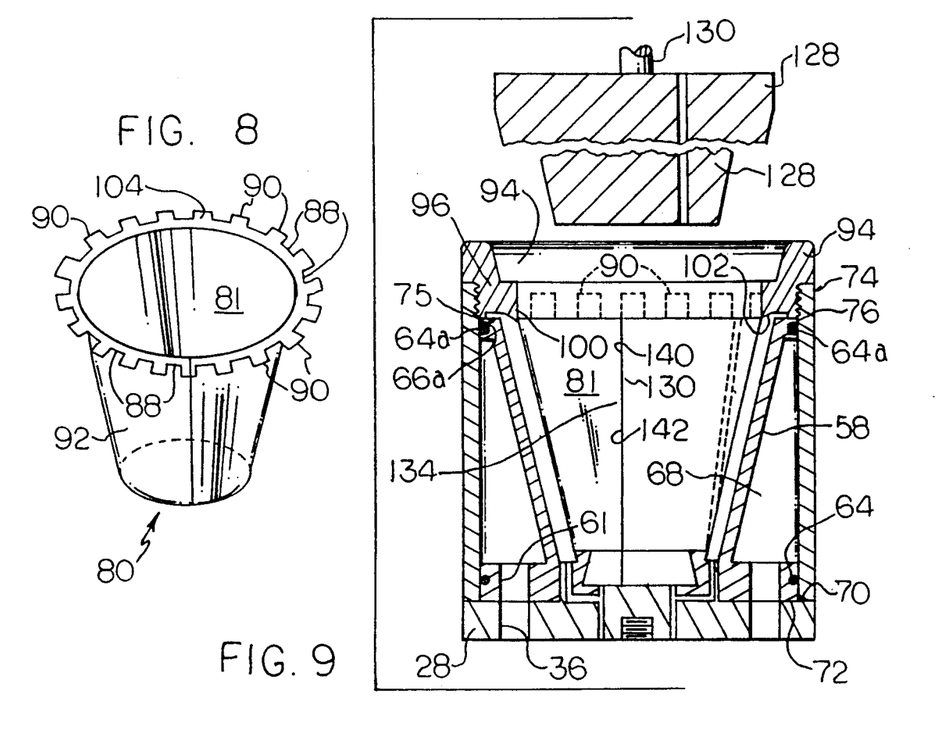
FIG. 8 is a perspective view illustrating the decorating insert only in a stage of assembly.
FIG. 9 is a sectional side view illustrating a successive stage of assembly, with the insert in the position illustrated in FIG. 8.

When the top ring 94 is threaded onto the sleeve insert 62, the annular retaining lip 100 will force the securing tabs 90 to swing radially outwardly about the hinge connections 104 from the positions illustrated in FIG. 7, in the plane of the main body portion 92 the insert 80 to the folded positions illustrated in FIGS. 1, 8 and 9. The top insert retaining ring 94 will exert axially inwardly directed force against the insert 80 to sandwich the terminal edge portion tabs 90 between the top ring surface 102 and the bottom retaining ring surface 75. When the top ring 94 is turned to the locking position illustrated in FIG. 1, it will bend over the upper tabs 90 and lock them in place and thus tightly hold the insert 80 and preclude its movement and thus prevent skewing of the embossed letter 110.

The side ring body 56, sleeve insert 62, and ornamentalizing insert 80 may be selectively interchanged with any selected ones of a plurality of substantially identical parts with the exception of the axial length thereof. For example, the apparatus as illustrated will form a container A which might hold 9 ounces of liquid. By utilizing a sleeve insert 62, main body side ring 56 and ornamentalizing insert 80 of greater axial length, a liquid container can be molded which might hold 18 ounces of liquid while utilizing the same base and top ring. Accordingly, it is relatively easy to interchange a portion of the structure to mold different size containers while retaining the majority of the structure.

It should be realized, of course, that as opposed to the sleeve insert being formed with a plastic receiving slot 106, the interior mold insert 80 could be bent or pressed radially inwardly to provide a raised contour portion which would follow the identical outlining of the letter M. Accordingly, rather than a raised letter 110 being formed on the side wall of the article A, the side wall of the article would be formed with the letter 110 in hollow relief. These forming technique is sometimes referred to as negative embossing.

Figure 2:
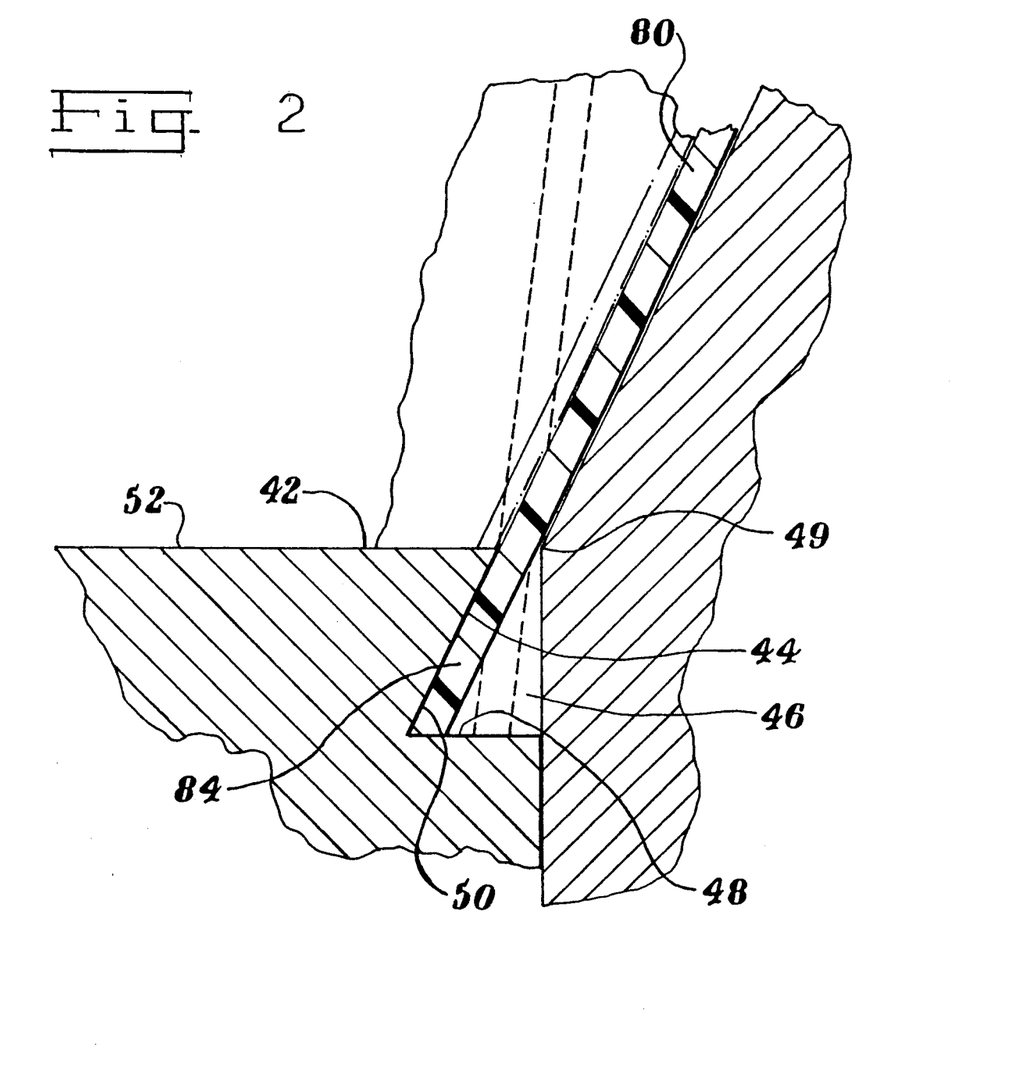
FIG. 2 is a greatly enlarged sectional side view of the portion encircled in the chain line circle 2—2 of FIG. 1.

It should be noted that if an embossing insert 80 of greater axial extent is utilized, the lowermost edge portion 84 will be in the position illustrated in chain lines in FIG. 2. Accordingly, the countersunk slot 44 is wider at the bottom to accommodate this change in position of the lowermost edge 84 for axially longer inserts 80.

It is also important to note that the clamping lip 100 will tend to wear as it successively engages the axially outer terminal edge portion 86 of the insert 80. If the ring wears, it is easy and relatively inexpensive to replace the ring as opposed to replacing the entire mold.

An annular hollow stripper ring 114 is mounted on the mold body 16 to encircle the mold recess 18 for vertical movement on the mold body 16 between the rest position, illustrated in solid lines in FIG. 1, flush with the upper surface 17 of the mold body 16, and a raised, article stripping position illustrated in chain lines in FIG. 1 via fluid pressure operated cylinders 118 mounted on the mold body 16 and having reciprocal pistons 120 coupled to the stripper ring 114.

A plurality of vacuum communicating notches 126 are provided in the lowermost end 122 of the ornamentalizing insert 80 to allow vacuum to be communicated to the mold cavity.

THE METHOD OF MAKING

The female mold assembly 14, with the exception of the ornamentalizing insert 80, is assembled as illustrated in FIG. 1.

Figure 4:
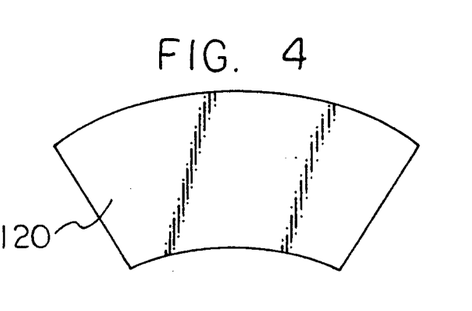
FIGS. 4–6 are greatly reduced side views illustrating successive steps in the formation of a decorating insert constructed according to the present invention.
Figure 5:
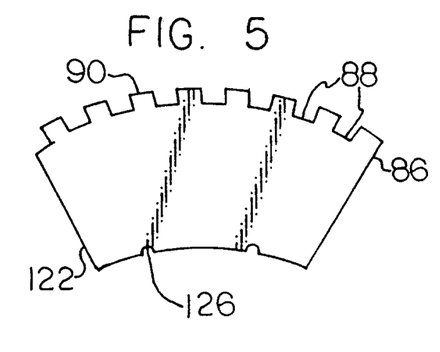
Figure 6:
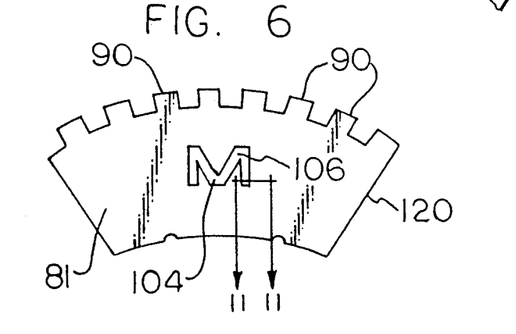

The ornamentalizing insert 80 is manufactured from a crescent shaped piece of material 120 (FIG. 4) such as aluminum which is cut to length from a sheet of aluminum. The notches 88 are then cut into one edge 86 and notches or slits 126 are cut into the opposite edge as illustrated in FIG. 5. A slot 106 is then cut into the surface 81 of insert 80 to provide an embossing recess 104a while the sheet 120 is flat or in a planar condition. The portion of the material defining the slot 106 is pressed or cut out of the plane of the aluminum sheet 120.

The sheet 120 is then wrapped around a frusto-conically shaped mandrel, schematically designated 128, which is mounted on a vertically moveable bar 130, so that the terminal end portions 132 and 134 of the sheet 120 are disposed in an overlapping relation as illustrated in FIG. 7.

The mandrel 128, with the crescent shape ornamental embossing insert sheet 120 wrapped therearound, is inserted into the mold cavity 116 and the sheet 120 is allowed to expand and spring outwardly under its own memory to the exact internal diameter of the cavity defined by ring 56 (FIGS. 8 and 9). The rolled out length L of the crescent shaped sheet 120 is identical to the internal circumference of the corresponding mold surface 82 of the side ring member 58. The mandrel 128 is pressed against the sheet 120 to ensure that the terminal ends 140 and 142 of the portions 130 and 134 respectively are in abutting relation.

The ornamentalizing insert 80 is relatively inexpensive compared to the overall cost of the mold and can be inserted and removed easily and at little cost. Accordingly, a short run of articles A can be produced without incurring the cost attended to embossing the normal molds.

If it is desired to form a part with a logo or letter different than the letter M, the insert 80 is removed and another insert with other logo or letter 106 thereon inserted.

THE OPERATION

The mold, with a truncated cone shaped insert 80 is assembled as illustrated in FIG. 1 and a plastic sheet S is moved between the die box assemblies 12 and 14. The die box assemblies are moved together between the spaced apart positions illustrated in FIG. 1 and the closed positions illustrated in FIG. 3 and in chain lines in FIG. 1 engaging opposite sides of the sheet S and moving a portion of the sheet S into the female mold cavity 79. Vacuum is then applied from vacuum source 34 and the pressurized air is provided through the ports 24 to form the article A.

The air or vacuum communicating notches 126 in the lower edge thereof communicate vacuum to the inside of the forming cavity.

The molds are then separated and the article severed from the sheet.

When it is desired to form a container with a different insignia, word, letter, etc., a different insert 80 with a different inscription thereon can be utilized.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A female mold for differential pressure forming an article in a sheet of thermoplastic material comprising:
   a mold body including a female mold cavity;
   means for communicating a vacuum source to said cavity to draw a portion of said sheet into said cavity;
   a replaceable mold liner detachably received in said cavity for forming the shape of a portion of an article to be formed; and
   annular retaining ring means threadedly mounted on said mold body for detachably retaining said mold liner in said cavity.

2. The mold set forth in claim 1 wherein said mold liner comprises a hollow truncated cone.

3. The mold set forth in claim 1 wherein said mold liner comprises a rolled sheet having opposite ends disposed in abutting relation.

4. The mold set forth in claim 3 wherein said mold liner comprises a hollow truncated cone.

5. The mold set forth in claim 3 wherein said rolled sheet includes embossing recesses thereon for embossing the sidewall of an article being formed.

6. The mold set forth in claim 1 wherein said mold body includes a lower end wall defining an inner end of said cavity and including an annular slot for receiving one end of said insert.

7. The mold set forth in claim 6 wherein said annular retaining ring means includes securing ring means detachably mounted on said body for detachably securing the opposite end of said insert in said cavity.

8. The mold set forth in claim 7 wherein said ring means is threadedly mounted on said mold body.

9. The mold set forth in claim 1 wherein said insert includes a hollow main body portion and an integral annular end portion adjacent said ring means which flares radially outwardly relative to said main body portion.

10. A female mold for differential pressure forming an article in a sheet of thermoplastic material comprising:
a mold body having a mold cavity therein;
means for applying differential pressure to opposite sides of a portion of said sheet in said cavity to form an article in said sheet;
a replaceable mold liner received by said cavity for forming a portion of the wall of an article to be formed wherein said replaceable mold liner comprises
a one-piece, annularly disposed sheet having opposite ends in abutting relation; and
means on said body for detachably securing said mold liner to said body.

11. The mold set forth in claim 10 wherein said sheet includes an axially outer end portion including circumferentially spaced end portions separated by a plurality of spaced apart slits permitting said circumferentially spaced end portions of said sheet between said slits to be flared radially outwardly; and said securing means including ring means axially securing said axially outer end portions.

12. The mold set forth in claim 10 wherein said sheet includes an axially inner end portion; said mold cavity including an annular countersunk portion for receiving said axially inner end portion of said liner.

13. The mold set forth in claim 12 wherein said sheet includes an axially outer end portion, said securing means includes ring means threadedly mounted on said body for detachably securing said axially outer end portion of said liner.

14. The mold set forth in claim 13 wherein said axially outer opposite end portion flares radially outwardly relative to said axially inner end.

15. The apparatus set forth in claim 10 wherein said mold body comprises
a mold base having a portion defining an end of said cavity and including an annular slot for receiving one end of said liner.

16. The apparatus set forth in claim 15 wherein said slot includes an axially outer, radially narrowed throat portion and an axially inner radially widened base portion for allowing said insert to be received and inclined in any selected one of a plurality of different inclined positions.

17. The apparatus set forth in claim 10 wherein said mold body comprises
a mold base having a portion defining an end of said cavity;
an annular mold side wall defining a cavity side wall for receiving said insert.

18. The apparatus set forth in claim 17 wherein said means for securing said insert comprises ring means threadedly mounted on said annular side wall.

19. The apparatus set forth in claim 18 wherein annular side wall includes a main wall portion coupled to said base and a terminal end, radially outwardly flaring end wall portion adjacent said ring means.

20. Apparatus for differential pressure forming an article having a predetermined axis in a sheet of thermoplastic material comprising:
a differential pressure mold including a female mold cavity having an axially outer open end and a closed axially inner end;
means for applying differential pressure to a portion of said sheet to axially inwardly draw said sheet portion to form an article in said cavity;
a replaceable, hollow mold sleeve insert detachably disposed in said cavity for forming at least a portion of said article;
said sleeve having a side wall which flares radially outwardly in an axially outward direction.

21. The apparatus set forth in claim 20 wherein said sleeve includes a first annular portion and an axially outer tapered end portion which flares radially outwardly in an axially outward direction relative to the first annular portion.

22. The apparatus set forth in claim 20 wherein said sidewall includes axially outer, circumferentially disposed, terminal end portions separated from adjacent end portions by a plurality of axially extending slits to allow the terminal end portions between said slits to be flared outwardly relative to the remaining portion of said sidewall.

23. Apparatus for differential pressure forming an article in a sheet of thermoplastic material comprising:
a mold base having a female mold cavity therein;
means for applying differential pressure to a portion of said sheet of material to form an article in said cavity;
a detachable inscription insert detachably received in said cavity comprising a crescent shaped sheet of material having opposite ends rolled into a truncated cone with said opposite ends in abutting relation; and
means for detachably retaining said insert in said cavity.

24. The apparatus set forth in claim 23 wherein said truncated cone includes a reduced diameter inner end and an enlarged diameter outer end; said outer end including a terminal end portion having a plurality of slits defining a plurality of circumferentially spaced apart end sections which flare radially outwardly relative to said inner end.

25. The apparatus set forth in claim 23 wherein said retaining means includes a ring threadedly mounted on said mold base.

26. The apparatus set forth in claim 23 wherein said truncated cone includes a reduced diameter inner end and an enlarged diameter outer end;

said mold base including an annular slot for receiving said reduced diameter inner end.

27. The apparatus set forth in claim 26 wherein said retaining means includes a retaining ring threadedly mounted on said mold base.

28. Apparatus for differential pressure forming an article in a sheet of thermoplastic material comprising:
a mold body including a mold cavity therein having an axially outer, open end, and an axially inner closed end;
means for applying differential pressure to a portion of said sheet in said cavity to form an article in said portion of said sheet;
a one piece, annularly disposed, detachable mold insert received in said cavity and including decorating means for defining the shape of a portion of said article being formed; and
means for detachably securing said insert in said cavity;
said insert including a side wall with a main tapered sidewall section flaring radially outwardly in an axially outward direction.

29. The apparatus set forth in claim 28 wherein said tapered sidewall includes an axial outer terminal end portion which flares radially outwardly in an axial outward direction, relative to said tapered sidewall section; said securing means comprises a ring threadedly clamping said terminal end portion to said mold body.

30. Mold apparatus for forming an article in a sheet of thermoplastic material comprising:
a mold base having an end wall defining an end portion of a mold cavity;
an annular mold ring mounted on said base and defining a recess;
a hollow one piece mold insert comprising
a sheet of material having opposite ends and rolled into an annular shape with said opposite ends disposed in abutting relation and received in said recess to form the shape of a side wall portion of the article; and
means detachably mounting said mold insert on said mold body.

31. Differential pressure mold apparatus for forming an article in thermoplastic material comprising:
a mold base forming an end of a female mold cavity having a longitudinal axis and adapted to receive said theremoplastic material;
a mold ring detachably mounted on said mold base and including an annular internal support surface;
a sleeve insert detachably mounted on said base and bearing against said surface to form at least a portion of said female mold cavity; and
means detachably mounted on said mold ring for detachably securing said sleeve insert.

32. The apparatus set forth in claim 31 wherein said support surface tapers radially outwardly in an axially outward direction away from said base;
said insert comprising a one-piece sheet of material rolled into the shape of a frusto-conical cone.

33. The apparatus set forth in claim 31 wherein said sleeve insert includes a frusto-conical cone sidewall and an axially outer, radially outwardly flaring terminal flange portion integral with said cone; said means for securing said sleeve unit including securing ring means detachably threadedly mounted on said mold ring and including an annular retaining lip for detachably bearing against said terminal flange portion.

34. The apparatus set forth in claim 33 wherein said terminal flange portion includes a plurality of slits in the axially outer edge of said insert separated by tabs which are normally in alignment with said cone but are radially outwardly swingable relative to said balance of said cone to radially outwardly flared positions; said annular retaining lip being rotatably moveable between an axially removed position and an axially inward position in which said ring forces said tabs to swing radialy outwardly to said radially outwardly flared positions.

35. The apparatus set forth in claim 34 wherein said mold ring includes a hollow cylinder and an annular, tapered mounting body, having an annular sidewall which diverges radially outward in an axially outward direction, detachably mounted on said hollow cylinder.

36. The apparatus set forth in claim 35 wherein said sleeve includes a terminal portion extending axially outwardly beyond said annular tapered sidewall; said means for detachably securing said sleeve insert includes a retaining ring threadedly mounted on said terminal portion of said hollow cylinder.

37. An ornamentalizing insert for ornamentalizing an article differentially pressure formed in a sheet of thermoplastic material with a differential pressure mold having a female mold cavity comprising
a one-piece hollow truncated cone having an interior surface formed in relief to shape the contour of a portion of the article being formed.

38. The insert set forth in claim 37 wherein said cone comprises a sheet having terminal ends disposed in abutting relation.

39. An embossing insert for a differential pressure female mold cavity which forms a differentially pressure formed article in a sheet of thermoplastic material comprising
a crescent shaped layer of material rolled into a hollow truncated cone and including opposite terminal ends disposed in abutting relation;
said layer being formed in relief to ornamentalize a portion of the article being formed.

40. The apparatus set forth in claim 30 wherein said insert includes axially inner and outer end portions; said mold body including an annular slot for receiving said axially inner end portion of said insert.

* * * * *